United States Patent [19]

Rudolph et al.

[11] Patent Number: 4,471,927
[45] Date of Patent: Sep. 18, 1984

[54] TRAILING EDGE FLAP ASSEMBLY

[75] Inventors: Peter K. C. Rudolph, Seattle; Verne L. Hudson, Bellevue, both of Wash.

[73] Assignee: The Boeing Company, Seattle, Wash.

[21] Appl. No.: 306,653

[22] Filed: Sep. 29, 1981

[51] Int. Cl.³ .......................... B64C 3/50; B64C 21/02
[52] U.S. Cl. ..................................... 244/215; 244/216
[58] Field of Search ............... 244/211, 212, 213, 215, 244/214, 219, 90 R

[56] References Cited

U.S. PATENT DOCUMENTS

| | | |
|---|---|---|
| 1,567,531 | 12/1925 | Magni . |
| 1,803,915 | 5/1931 | Parmele . |
| 1,846,146 | 2/1932 | Rocheville . |
| 2,352,062 | 6/1944 | Zap . |
| 2,526,929 | 10/1950 | Bowcatt .......................... 244/216 |
| 3,076,623 | 2/1963 | Lyon . |
| 3,127,130 | 3/1964 | Lyon . |
| 3,179,357 | 4/1965 | Lyon . |
| 3,799,474 | 3/1974 | Scharzler ......................... 244/216 |
| 4,053,124 | 10/1977 | Cole . |

FOREIGN PATENT DOCUMENTS 2003098 3/1979 United Kingdom ............... 244/216
2060520 5/1981 United Kingdom ............... 244/215

Primary Examiner—Trygve M. Blix
Assistant Examiner—Rodney Corl
Attorney, Agent, or Firm—Hughes, Barnard & Cassidy

[57] ABSTRACT

A flap mounted in a track member for movement between a retracted and an extended position. The track member itself is pivotally mounted at a forward portion thereof for up and down rotational movement. With the flap in its retracted position, upward and downward rotation of the track causes the flap to move to upper and lower cambered positions. The flap member in its extended position forms a slot with the wing, and upward and downward rotational movement of the track changes the deflection angle of the flap member to provide greater or less lift, to optimize the wings for various cruise conditions, to alleviate gust loads and provide improved maneuverability.

17 Claims, 6 Drawing Figures

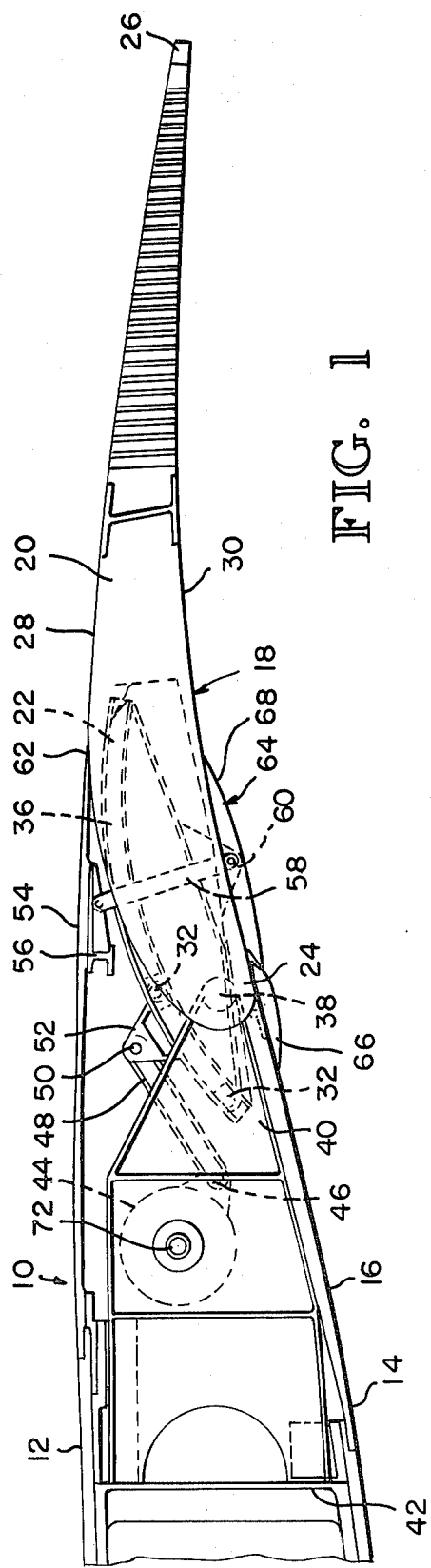
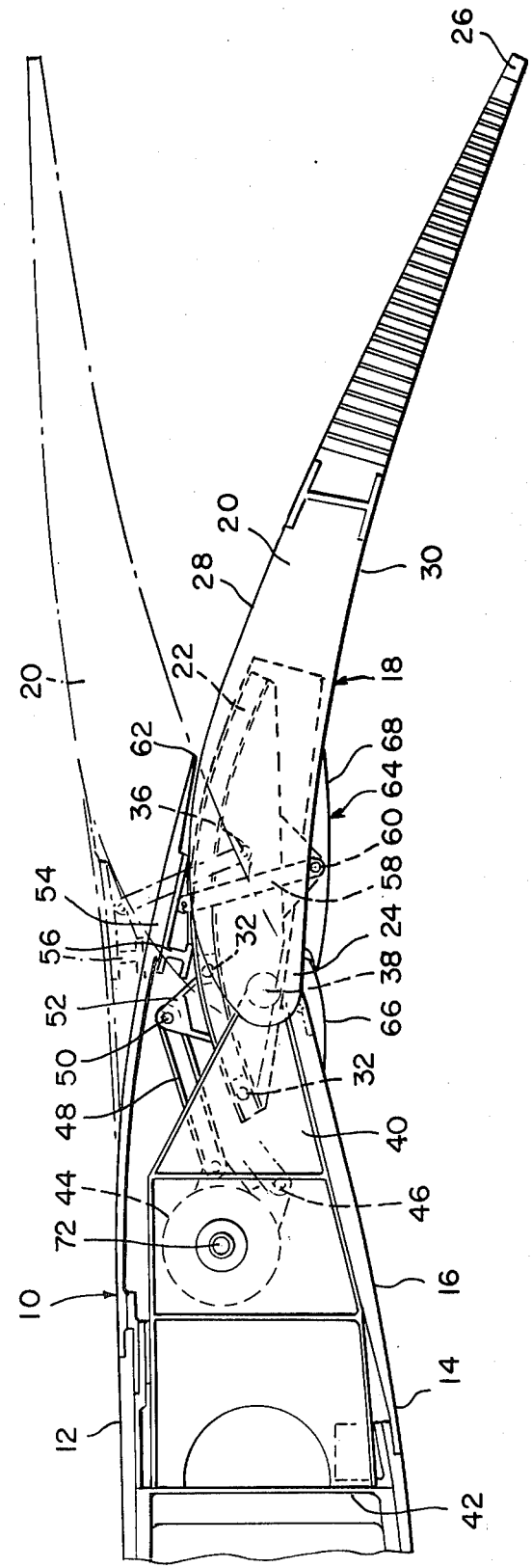

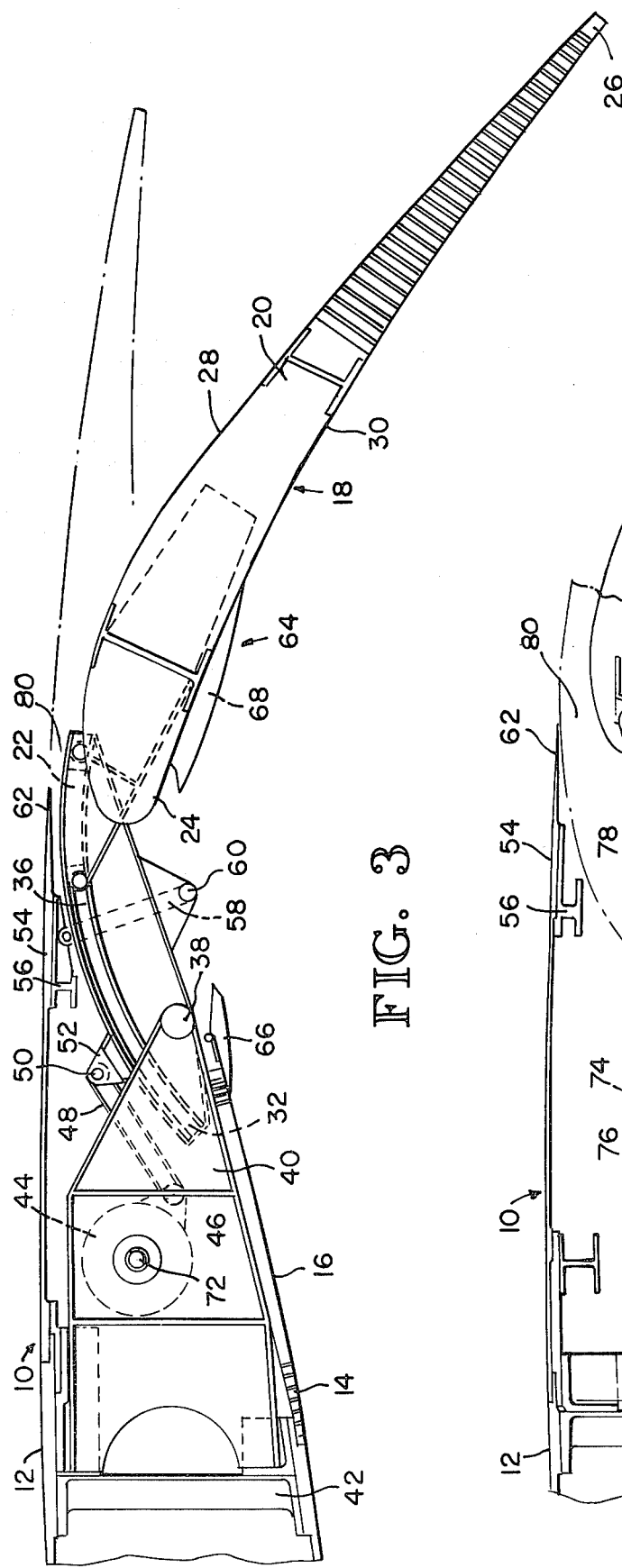
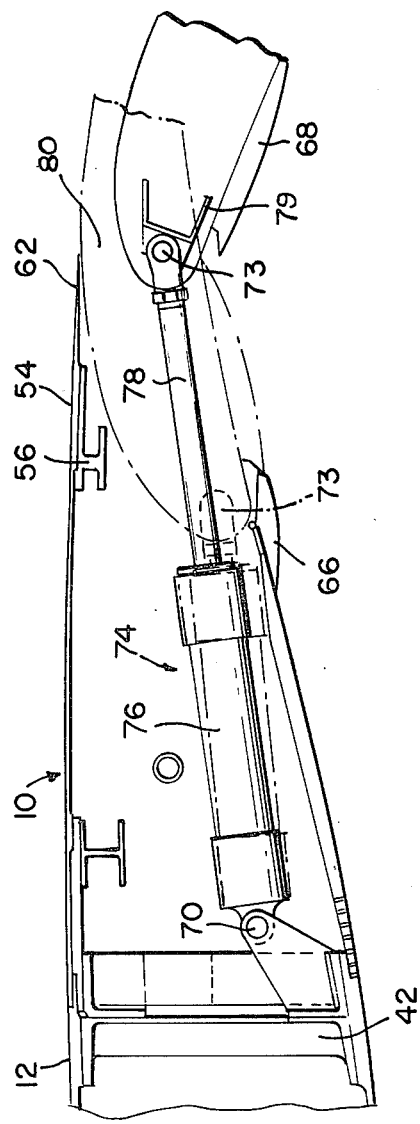

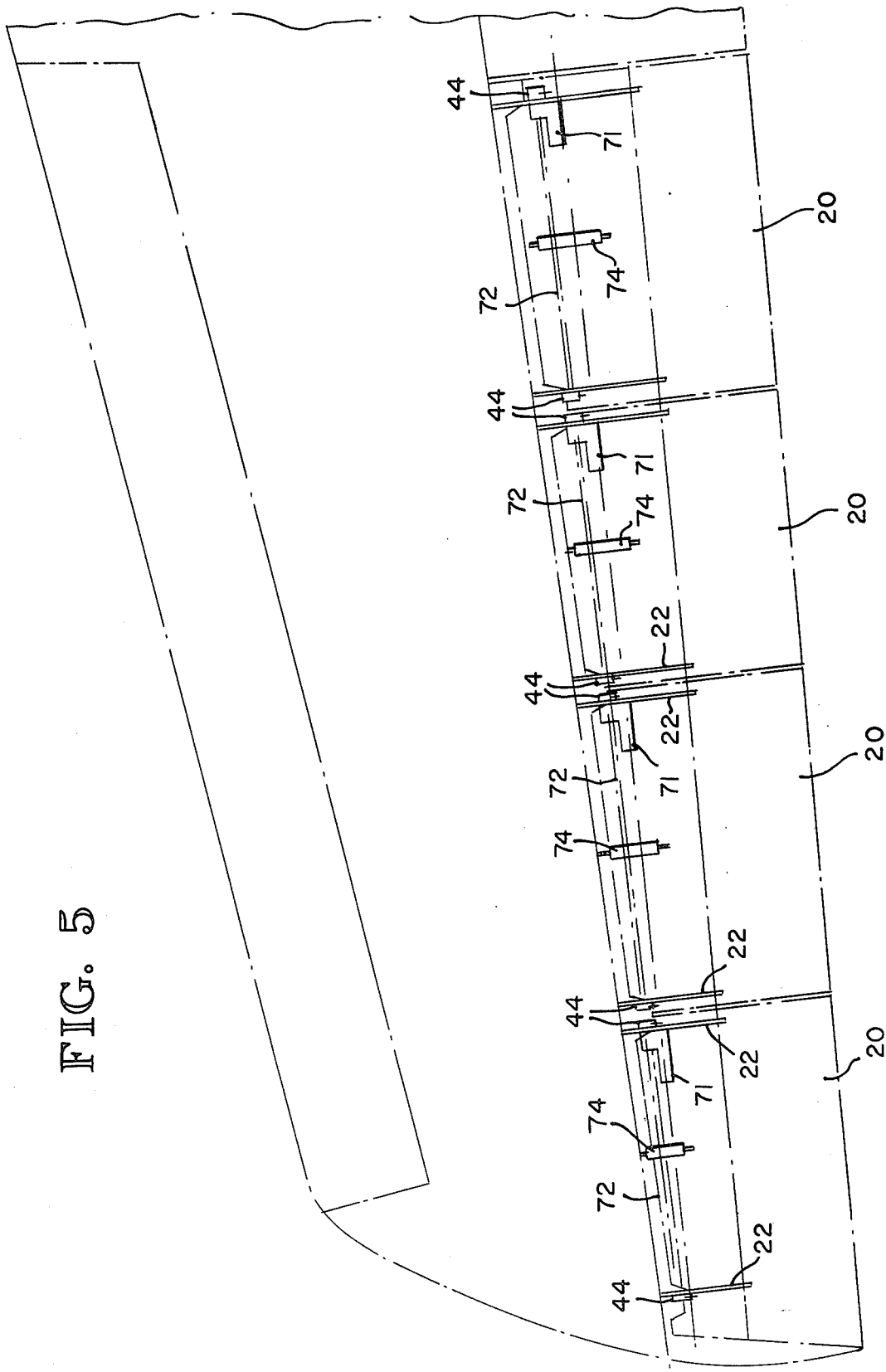

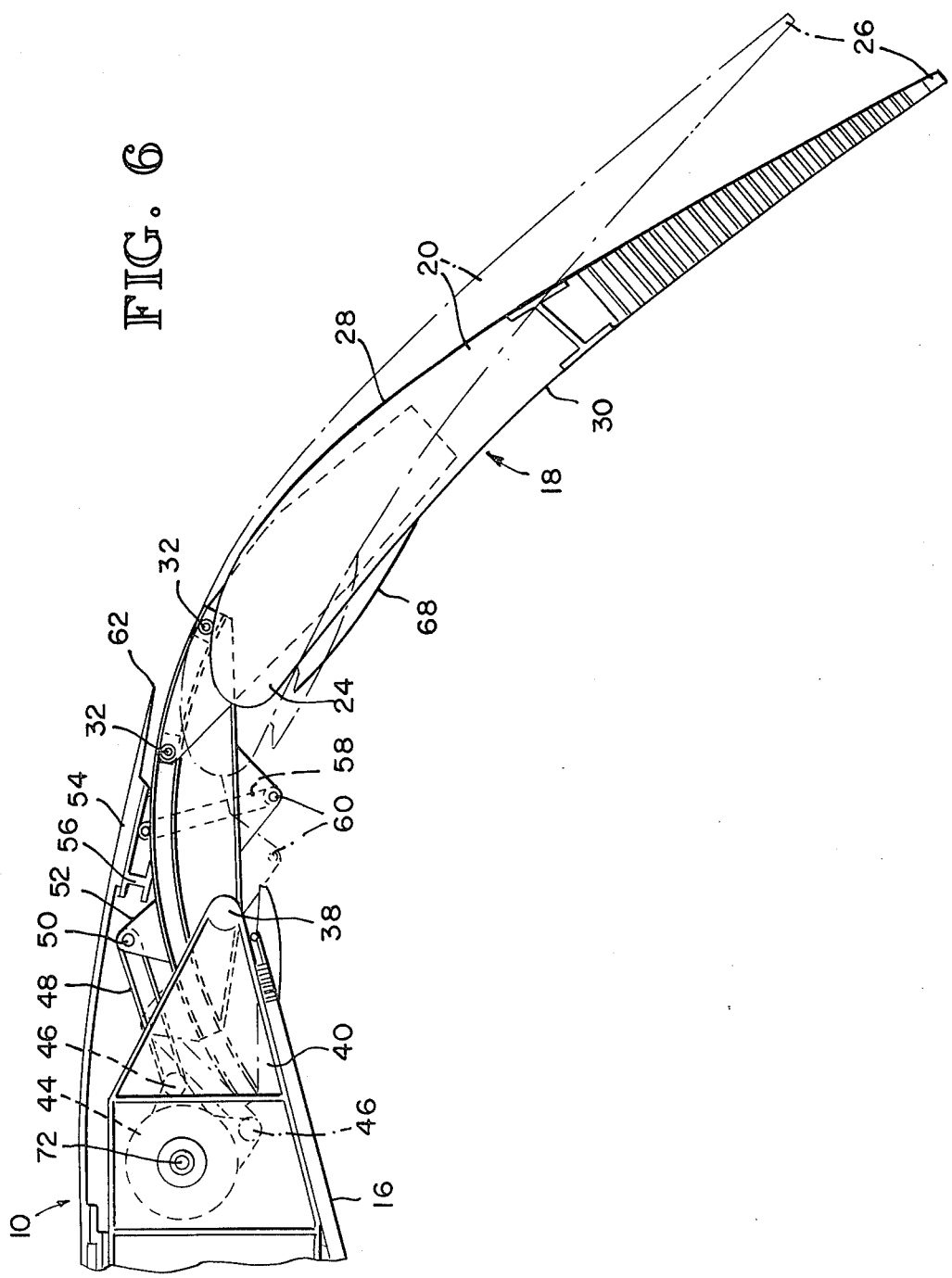

TRAILING EDGE FLAP ASSEMBLY

BACKGROUND OF THE INVENTION

The present invention relates to a trailing edge flap assembly for an aircraft, and more particularly to such a flap assembly that permits change of wing camber aft of the wing structural box, and also provides a slotted Fowler flap for high lift during low speed operation.

There are any number of devices in the prior art to change the wing camber for the purpose of gust load alleviation, improved climb and cruise lift-to-drag ratio (for fuel economy) and improved maneuverability. However, a highly cambered wing trailing edge will have flow separation on the upper wing surface when operating at high angles of attack. Therefore, in general these prior attempts at variable camber trailing edge devices have had poor low speed, high lift capability.

To accomplish high lift during low speed operation, there are also devices in the prior art to deploy a slotted Fowler flap. With air passing from beneath the airfoil through the slot formed by the flap and the wing, and over the flap, the Fowler flap can be positioned at relatively high deflection angles and provide relatively high lift for low speed operation.

A search of the prior art has disclosed a number of patents showing various arrangements for variable camber wings and also for trailing edge flaps. These are as follows.

U.S. Pat. No. 1,567,531, Magni, discloses in FIGS. 1 through 8 variable camber wing, but no trailing edge flap. In FIGS. 9 through 12, there is shown a simple hinge trailing edge flap, but not combined with variable camber.

U.S. Pat. No. 1,803,915, Parmele, shows a variable thickness wing.

U.S. Pat. No. 1,846,146, Roacheville, also discloses a variable thickness wing. At the trailing edge of the wing, there is a simple hinge, non-slotted flap.

U.S. Pat. No. 2,352,062, Zap, discloses a number of trailing edge configurations. In FIGS. 1 through 6, there is a hinge mounted blown flap. In FIGS. 8 and 9, there is shown a blown aileron. In FIGS. 11 through 16, there is shown a track mounted trailing edge flap mounted on curved tracks, and in one configuration with a hinged spoiler. In FIGS. 17 through 20, there is shown a trailing edge flap having a track mounted along the lower surface of the flap. This track in turn rides on rollers mounted to a flap support member, with the flap support member being pivotally mounted. This arrangement permits the flap to be moved into three principal locations, namely: a first flap retracted position, shown in FIGS. 18 and 19; second, a flap extended position (but not deflected) as shown in FIG. 19; and third, a position where the flap is extended and deflected downwardly. However, this arrangement does not show how a flap assembly can also be used effectively to accomplish variable camber for the trailing edge of the wing.

U.S. Pat. No. 3,076,623, Lyon, shows a variable thickness wing with an unslotted trailing edge flap in a straight track.

U.S. Pat. No. 3,127,130, Lyon, also shows a variable thickness wing. This wing has a variable camber flex trailing edge. There are some flap members pivotally mounted to the lower surface of the wing, which are presumably provided for speed brakes.

U.S. Pat. No. 3,179,357, Lyon, discloses yet another variable thickness and variable camber wing. The trailing edge portion has a hinge mounted element without Fowler motion.

U.S. Pat. No. 4,053,124, Cole, shows trailing and leading edge devices, but without a Fowler flap. Variable camber is achieved by a linkage system positioned largely within the flap member.

It is an object of the present invention to provide an effective flap assembly which has the capability of changing the camber of the wing, but also has the capability of functioning as a slotted Fowler flap for high lift during low speed operation.

SUMMARY OF THE INVENTION

The trailing edge flap assembly of the present invention is provided for an airfoil having a longitudinal and transverse axis, an upper and lower surface, and a forward and rear end. This flap assembly comprises a track member defining a track path which has a substantial longitudinal path component. As shown, the track member is curved, but a straight member could be used. The track member is pivotally mounted at a pivot location at the rear end of the airfoil for up and down rotational movement.

There is a flap member having a forward end and a rear end. The flap member has a track following mounting means mounted in the track member for movement between a first retracted forward position and a second extended rear position.

The track member and the flap member are so arranged that with the flap member in its retracted forward position, the pivot location is sufficiently close to the forward end of the flap member to permit upward rotational movement of the flap member to an upward cambered position. Also, this arrangement permits downward rotational movement of the flap member to a downward cambered position.

Also, the track member and the flap member are arranged so that with the flap member in its extended position, the track member is able to be rotated to move the flap member to an upper location in its extended position and a lower location in its extended position.

The track member has a forward portion and a rear portion. In the preferred configuration, the pivot location is located at the forward portion of the track member. Further, the flap member is so arranged relative to the track member that with the flap member in its retracted position, the forward end of the flap member is adjacent the forward portion of the track member so that rotational movement of the track member causes a relatively small vertical displacement of the flap member, and with the flap member in its extended position, the forward portion of the flap member is adjacent the rear portion of the track member so that rotational movement of the track member causes a relatively greater vertical displacement of the flap member.

At the trailing edge of the airfoil, there is an upper cover panel which remains in contact with the upper surface of the flap member when the flap member is in its retracted position. This is accomplished with a slave link interconnecting the cove panel and the track member. The cove panel is so arranged relative to the track member and the flap member, that with the flap member in its extended position, the flap member forms a slot with the trailing edge of the airfoil.

To move the flap member between its extended and retracted positions, there is provided linear actuating means having a first operative connection to the airfoil and a second connection to the forward end of the flap member. These first and second connections are aligned on a drive axis. With the flap member in its retracted position, the drive axis is generally aligned with the pivot location about which the track member rotates, so that the track member is able to rotate the flap upwardly and downwardly to achieve upward and downward camber, without interference from the linear actuating means. In the preferred form, the linear actuating means is an hydraulic extension jack, and desirably the second connection of the linear actuating means is a pivot connection which is generally coincident with an axis of rotation of the track member about its pivot location. Also, in the preferred form, there is a second actuating means to rotate the track member. Desirably, the second actuating means is through a drive member having an operative connection to the track member which is above the pivot location about which the track member rotates.

The preferred form of the track is that it defines its track path in a curved configuration which curves downwardly from a forward portion of the track path. In the preferred form, this curved path is about a circular arc. Alternatively, the track could be straight. This embodiment would be arranged so that the flap can be deployed in an aft and downward direction to provide Fowler motion as well as a slot. Downward and upward rotation of the flap would be accomplished solely through rotation of the track about its pivot. Both the curved and straight track embodiments of this invention facilitate use of either roller carriages or slide blocks.

Other features of the invention will become apparent from the following detailed description.

DESCRIPTION OF THE DRAWINGS

FIG. 1 is a longitudinal sectional view of the flap assembly of the present invention mounted in the trailing edge of an airfoil, with the flap member in its retracted position, and with the trailing edge being in an uncambered position;

FIG. 2 is a view similar to FIG. 1, but showing the flap assembly in full lines with the flap member in its retracted position being deflected downwardly for downward camber, and in broken lines showing the flap member in its retracted position being deflected upwardly for upward camber;

FIG. 3 is a view similar to FIGS. 1 and 2, showing the flap member in its extended position to function as a Fowler flap, and with the flap member being deflected moderately downwardly;

FIG. 4 is a view similar to FIG. 3, but is taken along a section line spaced moderately from the section line of FIG. 3, to show the hydraulic actuator for the flap member, with the flap member being shown in full lines in its fully extended position, and in broken lines in its retracted position;

FIG. 5 is a top plan view of an aircraft wing, showing the deployment of the flaps of the present invention; and FIG. 6 is a view similar to FIG. 3, showing the flap in its fully extended position with the track member shown in its downward position in solid lines and in its upward position in dashed lines.

DESCRIPTION OF THE PREFERRED EMBODIMENT

In each of the figures of the drawing, there is shown a trailing edge portion of a wing 10, having an upper surface 12, a lower surface 14, a forward end (not shown for convenience of illustration) and a rear end 16. The flap assembly 18 of the present invention is positioned at the trailing edge of the wing and has two main components, namely a flap member 20 and a track member 22. It is to be understood that the figures of the drawing disclose components at only one location along the span of the airfoil, and similar sets of components would be provided at other span-wise locations on the airfoil 10.

The flap member 20 has a leading edge 24, a trailing edge 26, and upper surface 28, and a lower surface 30. To mount the flap member to the track member 22, there is attached to the leading edge of the flap member 20 a pair of slide blocks 32. Blocks 32 may also take the form of rollers. These blocks 32 ride in a curved track 36 provided by the track member 22. In the preferred form, the track 36 defines a track path in the form of a circular arc which curves from its forward end in a downward direction.

The track member 22 is in turn mounted about a forward pivot location 38 adjacent the rear end of the lower wing surface 14. The track mounting is provided by stub ribs 40 extending rearwardly from the wing rear spar 42. The axis of rotation of the track member 22 about the pivot location 38 is about an axis generally coinciding with the transverse (i.e., spanwise) axis of the wing 10 or the wing rear spar 42.

To rotate the track member 22, there is provided a rotary hinge 44 which connects at 46 to one end of a drive link 48, the other end which connects at 50 to a bracket 52 connected to the track member 28 moderately above the pivot location 38. Both the pivot location 38 and the drive connection 50 are at a forward portion of the track member 22. Thus, the rotation of the rotary hinge 44 causes a rotation of the track member 22 in a manner that the rear portion of the track member 22 moves linearly a substantially greater distance than the forward portion of the track member 22.

At the rear end of the upper surface 12 of the wing 10, there is provided a flexible upper skin panel 54. Attached to the lower surface of the panel 54 is a support beam 56. A slave link 58 connects the support beam 56 to a lower connecting bracket 60 positioned at a lower mid portion of the track member 22. As shown, the lower end of slave link 58 at bracket 60 protrudes below the lower wing surface 14. This protrusion is aerodynamically covered by a fairing generally designated 64. The forward portion 66 of the fairing 64 is attached to the lower wing surface 14, while the aft portion 68 of the fairing 64 is attached to flap member 20. The panel 54 and the slave link 58 are so arranged that with the flap member 20 in its retracted position, the trailing edge 62 of the panel 54 remains in constant contact with the upper surface 28 of the flap member 20 when the flap member 20 is moved upwardly and downwardly to vary the camber at the trailing edge portion of the wing 10. This is illustrated in FIG. 2, which shows the flap member 20 in its retracted position, and the track member 22 rotated downwardly (in full lines) to provide a downward camber. The upward camber configuration is illustrated in broken lines of FIG. 2, and it can be seen that the trailing edge 62 remains in contact with the upper flap surface 28.

To describe the actuating means to move the flap member 20 between its retracted and extended position, reference is made to FIG. 4, which shows a hydraulic actuator 74, comprising a piston and cylinder 76 with a rod 78. The cylinder 76 is pivotally connected at 70 to the rear spar 42, and the end of the rod of the piston 78 is pivotally connected at 73 to a fitting 79 at the leading edge 24 of the flap member 20. With the flap member 20 in its retracted position (shown in broken lines in FIG. 4), the axis of the pivot connection 73 coincides with the axis of rotation of the track member 22 at the pivot location 38. Thus, with the flap member 20 in its retracted position, the track member 22 can be rotated upwardly and downwardly to the cambered positions of FIG. 2, without experiencing interference from the hydraulic actuator 74. In like manner, the actuator 74 can be operated independently of any rotational movement of the track member 22, without placing any appreciable torsion loads on the track member 22.

To illustrate the positioning of the components described thus far, reference is now made to FIG. 5, which shows a plurality of flap members 20 spaced along the trailing edge of the wing. One hydraulic actuator 74 is provided for each flap member 20, and is positioned at the mid length of the flap member 20. The track members 22 and rotary hinges 44 are positioned at each side edge portion of a flap member 20. Each flap member 20 has its own power drive unit which may take the form of either a hydraulic or electric motor, to provide rotational flap motion. Each power drive unit is geared to a drive shaft 72 that connects the respective two rotary hinges 44.

To describe the operation of the present invention, let it be assumed that the several flap members 20 along the wing 10 are in the position shown in FIG. 1, which is a retracted position for the flap 20 in an uncambered position. In this position, the lower surface 30 of the flap 20 forms a continuous lower aerodynamic surface with the lower surface 14 of the wing 10. In like manner, the middle and rear portion of the upper surface 28 of the flap member 20 forms a continuous aerodynamic surface with the upper surface 12 of the wing 10. In this position, the flaps 20 can be rotated upwardly and downwardly to upward and downward cambered positions, respectively, as illustrated in FIG. 2, with the upper and lower surfaces of the flap member 20 still being substantially continuous with the upper and lower surfaces of the wing 10. As indicated previously, this upward and downward movement of the flap member 20 to change camber is accomplished by rotation of the rotary hinge 44. Also, as indicated previously, because of the location of the hydraulic actuator 74, there is no interference from the hydraulic actuator 74 with respect to the camber movement. The slave link 58 moves the rear upper panel 54 upwardly and downwardly with the rotational movement of the track members 22 to insure contact of the panel 54 with the upper flap surface 28. The rear edge of the lower wing surface 14 is positioned very close to the axis of rotation at the pivot location 38 and can thus remain stationary during upward and downward camber movement of the flap members 20.

To move the flap members 20 rearwardly, the hydraulic actuator 74 is extended to cause the slide blocks 32 to move rearwardly on the tracks 36. With the track pathways being curved in a circular arc, the rearward movement of the flap 20 is not only rearwardly, but the flap 20 is also deflected downwardly, as illustrated in FIG. 3. In addition, the rearward and rotational movement of the flap member 20 causes the upper flap surface 28 to move away from the trailing edge 62 of the panel 54, thus forming a slot 80 between the leading edge 24 of the flap 20 and the trailing edge of the wing 10. Thus it becomes apparent that the several flap members 20 now function as slotted Fowler flaps. In the straight track embodiment, flap member 20 moves aft and downwardly to provide Fowler motion and a slot. Rotation of flap member 20 is accomplished by rotation of the rotary hinge 44.

With the several flaps 20 being in the position of FIG. 3, the track members 22 can be rotated downwardly to deflect the flap members 20 to a fully deflected downward position. This position is shown in FIG. 6. The rotary hinge actuating device 71 and the hydraulic actuating device 74 can each be used independently of one another. Also, these can be used in conjunction with one another to provide various combinations of deflection of Fowler motion.

These trailing edge devices can be rotated in unison, both to the retracted and extended positions, to produce changes in airplane lift. They also may be moved differentially between right and left wings for roll control and can be moved in a symmetrical, stepped manner for changes in spanwise lift distribution in gust alleviation and to produce increased drag for a speed brake effect. Within the broader aspects of the present invention, it is to be understood that a related flap assembly could possibly be adapted for a leading edge of an airfoil. Under such circumstances, the description herein would be meant to apply to that situation also, with the terms forward and rearward simply being reversed. Also, an interpretation of the following claims would also apply to such a situation, with the terms forward and rearward simply being interchanged to cover such an application.

Now therefor I claim:

1. A trailing edge flap assembly for an airfoil having a longitudinal axis and a transverse axis, an upper surface and a lower surface, and a forward end and a rear end, said flap assembly comprising:
   a. a track member defining a track path which has a substantially longitudinal track component, said track member being pivotally mounted at a pivot location at the rear end of the airfoil for up and down rotational movement,
   b. a flap member having a forward end and a rear end, said flap member having a track following mounting means mounted in said track member for movement between a first retracted forward position and a second extended rear position,
   c. said track member and said flap member being so arranged that with said flap member in its retracted position, said pivot location is sufficiently close to the forward end of the flap member to permit upward rotational movement of the flap member to an upward cambered position, and downward rotational movement of the flap member to a downward cambered position, with the flap forward end remaining within aerodynamic contours of the airfoil in both the upward and downward position,
   d. said track member and said flap member further being arranged so that with said flap member in its extended position, said track member is able to be rotated to move said flap member to an upper location in its extended position and also to a lower location in its extended position,
   e. a first independent actuating means to rotate the track member from an intermediate location both upwardly and downwardly when said flap member is in its retracted position, and also when said flap member is in its extended position, f. a second independent actuating means to move the flap between its first and second positions, said second and first actuating means each being independently operable so that the first actuating means can rotate the track member independently of any actuation of the second actuating means, so that the track member with the flap member can be rotated upwardly and downwardly, with the flap member remaining in either its retracted position or its extended position.

2. The flap assembly as recited in claim 1, wherein said track member has a forward portion and a rear portion, said pivot location being located at said forward portion, said flap member being so arranged relative to the track member that with the flap member in its retracted position, the forward end of the flap member is adjacent said forward portion so that rotational movement of the track member causes relatively less linear movement of the flap member, and with the flap member in its extended position, the forward portion of the flap member is adjacent the rear portion of the track member so that rotational movement of the track member causes relatively greater linear movement of the flap member.

3. The flap assembly as recited in claim 2, wherein said flap member is so arranged relative to a trailing edge of the upper surface of the airfoil that with said flap member in its retracted position, an upper surface of the flap member remains in contact with the trailing edge of the upper surface of the airfoil, and with the flap member in its extended position the upper surface of the flap member is spaced from the trailing edge of the upper surface of the airfoil to provide a slot between the flap member and the airfoil.

4. The assembly as recited in claim 1, wherein said flap member is so arranged relative to a trailing edge of the upper surface of the airfoil that with said flap member in its retracted position, an upper surface of the flap member remains in contact with the trailing edge of the upper surface of the airfoil, and with the flap member in its extended position the upper surface of the flap member is spaced from the trailing edge of the upper surface of the airfoil to provide a slot between the flap member and the airfoil.

5. The assembly as recited in claim 4, wherein said airfoil has a flexible upper skin panel at the upper trailing edge of the upper surface of the airfoil, said assembly further comprising slave link means to interconnect said upper skin panel with said track member so that the flexible upper skin panel remains in contact with the upper surface of the flap member with the flap member in its retracted position.

6. The flap assembly as recited in claim 1, wherein said airfoil has a flexible upper skin panel at the upper trailing edge of the upper surface of the airfoil, said assembly further comprising slave link means to interconnect said upper skin panel with said track member so that the flexible upper skin panel remains in contact with an upper surface of the flap member, with the flap member in its retracted position.

7. The flap assembly as recited in claim 1, where said second actuating means comprises a linear actuating means having a first operative connection to said airfoil and a second operative connection to the forward end of said flap member, said first and second connections being aligned on a drive axis, said drive axis being generally aligned with the pivot location of said track member when said flap member is in its retracted position.

8. The flap assembly as recited in claim 7, wherein said second connection is a pivot connection having a second pivot location, said second pivot location being generally coincident with an axis of rotation of said track member about the pivot location of the track member, when said flap member is in its retracted position.

9. The flap assembly as recited in claim 8, wherein said linear actuating means comprises an hydraulic extension jack extending between said first and second operative connections.

10. The flap assembly as recited in claim 7, wherein said first actuating means has a drive connection to said track member at a drive location positioned above the pivot location of the track member and above the drive axis of said linear actuating means.

11. A trailing edge flap assembly for an airfoil having a longitudinal axis and a transverse axis, an upper surface and a lower surface, and a forward end and a rear end, said flap assembly comprising:

a. a track member defining a track path which has a substantially longitudinal track component, said track member being pivotally mounted at a pivot location at the rear end of the airfoil for up and down rotational movement, b. a flap member having a forward end and a rear end, said flap member having a track following mounting means mounted in said track member for movement between a first retracted forward position and a second extended rear position, c. said track member and said flap member being so arranged that with said flap member in its retracted position, said pivot location is sufficiently close to the forward end of the flap member to permit upward rotational movement of the flap member to an upward cambered position, and downward rotational movement of the flap member to a downward cambered position, with the flap forward end remaining within aerodynamic contours of the airfoil in both the upward and downward positions, d. said track member and said flap member further being arranged so that with said flap member in its extended position, said track member may be rotated to move said flap member to an upper location in its extended position and also to a lower location in its extended position, e. said flap member being so arranged relative to a trailing edge of the upper surface of the airfoil that with said flap member in its retracted position, an upper surface of the flap member remains in contact with the trailing edge of the upper surface of the airfoil, and with the flap member in its extended position the upper surface of the flap member is spaced from the trailing edge of the upper surface of the airfoil to provide a slot between the flap member and the airfoil, f. a first independent actuating means to rotate the track member from an intermediate location both upwardly and downwardly when said flap member is in its retracted position, and also when said flap member is in its extended position, g. a second independent actuating means to move the flap between its first and second positions, said second and first actuating means each being independently operable so that the first actuating means can rotate the track member independently of any actuation of the second actuating means, so that the track member with the flap member can be rotated upwardly and downwardly, with the flap member remaining in either its retracted position or its extended position.

12. The assembly as recited in claim 11, wherein said airfoil has a flexible upper skin panel at the upper trailing edge of the upper surface of the airfoil, said assembly further comprising slave link means to interconnect said upper skin panel with said track member so that the flexible upper skin panel remains in contact with the upper surface of the flap member with the flap member in its retracted position.

13. A trailing edge flap assembly for an airfoil having a longitudinal axis and a transverse axis, an upper surface and a lower surface, and a forward end and a rear end, said flap assembly comprising:
  a. a track member defining a track path which has a substantially longitudinal track component, said track member being pivotally mounted at a pivot location at the rear end of the airfoil for up and down rotational movement,
  b. a flap member having a forward end and a rear end, said flap member having a track following mounting means mounted in said track member for movement between a first retracted forward position and a second extended rear position,
  c. said track member and said flap member being so arranged that with said flap member in its retracted position, said pivot location is sufficiently close to the forward end of the flap member to permit upward rotational movement of the flap member to an upward cambered position, and downward rotational movement of the flap member to a downward cambered position, with the flap forward end remaining within aerodynamic contours of the airfoil in both the upward and downward position,
  d. said track member and said flap member further being arranged so that with said flap member in its extended position, said track member is able to be rotated to move said flap member to an upper location in its extended position and also to a lower location in its extended position,
  e. said airfoil having a flexible upper skin panel at the upper trailing edge of the upper surface of the airfoil, said assembly further comprising slave link means to interconnect said upper skin panel with said track member so that the flexible upper skin panel remains in contact with an upper surface of the flap member, with the flap member in its retracted position,
  f. a first independent actuating means to rotate the track member from an intermediate location both upwardly and downwardly when said flap member is in its retracted position, and also when said flap member is in its extended position,
  g. a second independent actuating means to move the flap between its first and second positions, said second and first actuating means each being independently operable so that the first actuating means can rotate the track member independently of any actuation of the second actuating means, so that the track member with the flap member can be rotated upwardly and downwardly, with the flap member remaining in either its retracted position or its extended position.

14. The flap assembly as recited in claim 13, wherein said second actuating means comprises a linear actuating means having a first operative connection to said airfoil and a second operative connection to the forward end of said flap member, said first and second connections being aligned on a drive aixs, said drive axis being generally aligned with the pivot location of said track member when said flap member is in its retracted position.

15. The flap assembly as recited in claim 14, wherein said second connection is a pivot connection having a second pivot location, said second pivot location being generally coincident with an axis of rotation of said track member about the pivot location of the track member, when said flap member is in its retracted position.

16. The flap assembly as recited in claim 15, wherein said linear actuating means comprises an hydraulic extension jack extending between said first and second operative connections.

17. The flap assembly as recited in claim 14, wherein said first actuating means has a drive connection to said track member at a drive location positioned above the pivot location of the track member and above the drive axis of said linear actuating means.

* * * * *